United States Patent
Kaburagi et al.

[11] Patent Number: 6,125,712
[45] Date of Patent: Oct. 3, 2000

[54] DRIVING APPARATUS

[75] Inventors: Keitaro Kaburagi; Youichi Konno, both of Tokorozawa, Japan

[73] Assignee: Pioneer Electronic Corporation, Tokyo-to, Japan

[21] Appl. No.: 09/265,038

[22] Filed: Mar. 9, 1999

[30] Foreign Application Priority Data

Mar. 18, 1998 [JP] Japan .................................. 10-089316

[51] Int. Cl.7 ...................................................... F16D 1/06
[52] U.S. Cl. ........................ 74/421 R; 474/903; 403/14; 403/261; 403/329
[58] Field of Search ................................... 403/216, 256, 403/326, 329, 13, 14, 375; 74/412 R, 421 R, 411; 474/903

[56] References Cited

U.S. PATENT DOCUMENTS

| | | | |
|---|---|---|---|
| 389,663 | 9/1888 | Murdock | 74/421 R |
| 1,364,249 | 1/1921 | Cetwick | 403/261 |
| 4,576,505 | 3/1986 | Wrightson et al. | 474/903 |
| 4,869,455 | 9/1989 | Weeks | 74/421 R |

*Primary Examiner*—Sherry L. Estremsky
*Attorney, Agent, or Firm*—Pitney, Hardin, Kipp and Szuch LLP

[57] ABSTRACT

A driving apparatus comprises a rotation member, a shaft and a restriction member. The rotation member has a shaft-receiving portion. The shaft is fitted into the shaft-receiving portion so as to permit rotation of the rotation member relative to the shaft. The shaft has a protrusion projecting in a direction substantially perpendicular to an axial direction of the shaft. The restriction member prevents the rotation member from deviating in a projecting direction of the protrusion.

10 Claims, 12 Drawing Sheets

PRIOR ART

FIG. 8(b)

PRIOR ART

FIG. 8(c)

PRIOR ART

DRIVING APPARATUS

BACKGROUND OF THE INVENTION

1. Field of the Invention

The present invention relates to a driving apparatus, especially to a supporting structure of a rotation member such as a pulley.

2. Description of the Related Art

Figure 8A:
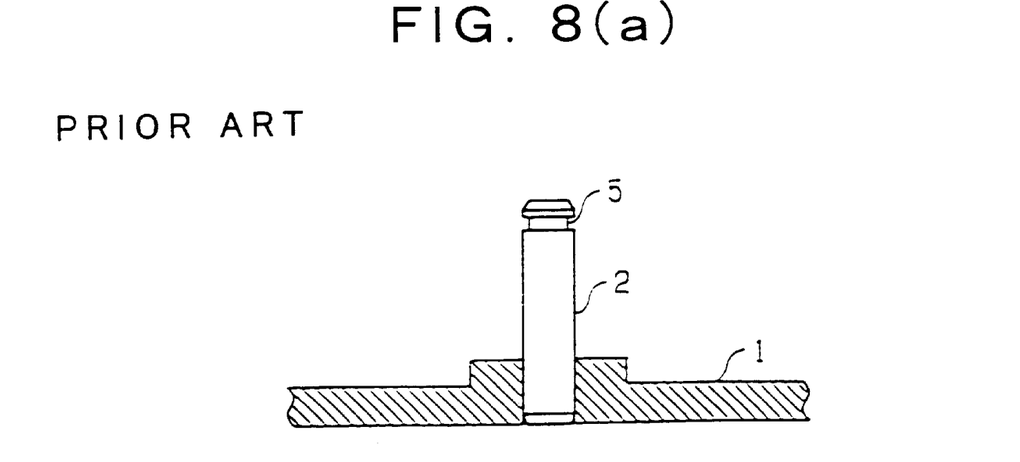
Figure 8B:
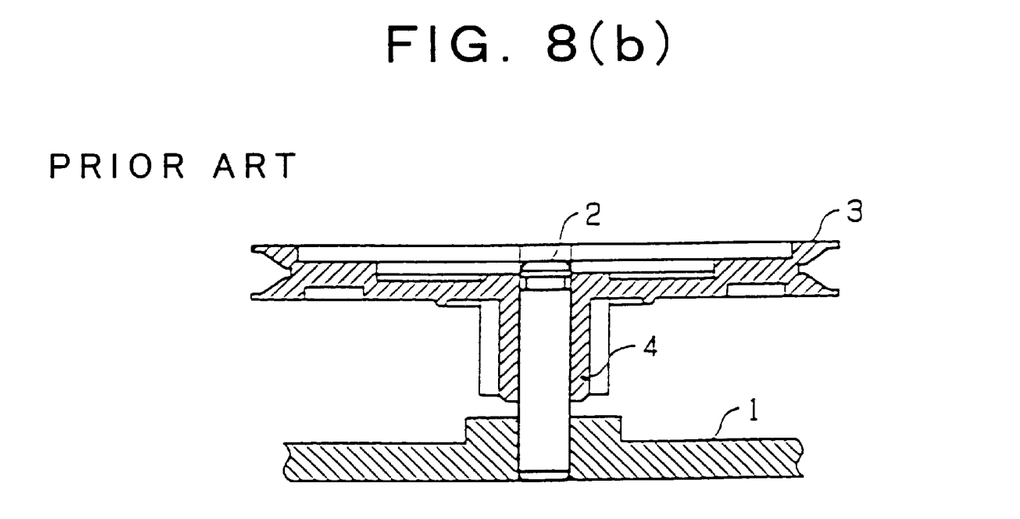
Figure 8C:
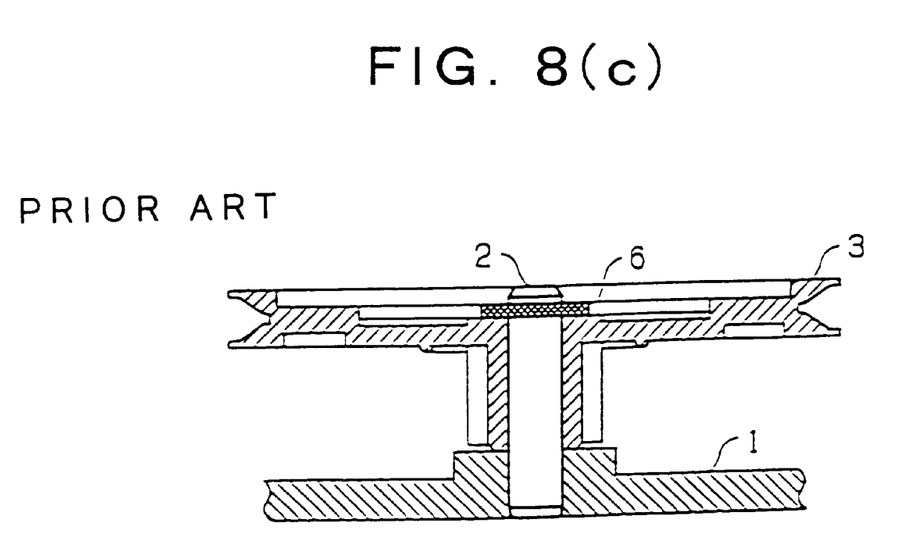

In the conventional electronic equipment such as a reproducing apparatus for a compact disc, a pulley is combined with a loading gear train in order to load or unload a tray for receiving the compact disc. With respect to a mounting method of the pulley, a shaft 2 made of metal is forcedly inserted into a hole formed on a chassis 1 made of synthetic resin as shown in FIG. 8(*a*) or is fixed to the chassis 1 by means of a fastening member such as a screw. The shaft 2 secured to the chassis 1 in this manner is then inserted into a shaft-receiving portion 4 formed in the center of the pulley 3 as shown in FIG. 8(*b*). Then, a retainer 6 such as a snap ring so-called "E-ring" is fitted into a ring-shaped groove 5 formed on the head portion of the shaft 2 so that the pulley 3 is rotatably supported on the shaft 2 as shown in FIG. 8(*c*).

However, in the conventional driving apparatus, the mounting operation of the pulley requires three steps of inserting forcedly the shaft 2 into the hole of the chassis 1 or fixing the shaft 2 to the chassis 1 by means of the screw, mounting the pulley 3 onto the shaft 2 and fitting the snap ring 6 into the groove 5 of the shaft 2. As a result, there are required three constructional components of the shaft 2, the pulley 3 and the snap ring 6.

In addition, the snap ring 6 to be fitted into the groove 5 of the shaft 2 has an inner diameter, which is slightly smaller than the diameter of a portion of the shaft 2, which defines the bottom of the groove 5 of the shaft 2, in order to prevent the pulley 3 from easily coming out from the shaft 2. As a result, an exclusive jig for fitting the snap ring 6 into the groove 5 is required together with many operational steps, thus leading to a complicated assembling operation.

SUMMARY OF THE INVENTION

An object of the present invention, which was made in order to solve the above-described problems, is therefore to provide a driving apparatus, which has a rotation member such as a pulley and permits to reduce a number of constructional components and assembling steps.

In order to attain the aforementioned object, the driving apparatus of the present invention comprises a rotation member having a shaft-receiving portion;

- a shaft fitted into said shaft-receiving portion so as to permit rotation of said rotation member relative to said shaft, said shaft having a protrusion projecting in a direction substantially perpendicular to an axial direction of said shaft; and
- a restriction member for preventing said rotation member from deviating in a projecting direction of said protrusion.

The restriction member may comprise a belt trained over the rotation member.

The restriction member may comprise a gear meshing with the rotation member.

The shaft may have on an opposite side to the protrusion a slant surface so that the shaft tapers off to a tip end thereof.

There may be adopted a structure in which the shaft has a front portion and a root portion, the front portion has on an opposite side to the protrusion a slant surface so that front portion tapers off to a tip end thereof, and the root portion has a cylindrical shape so as to rotatably support the rotation member.

According to the above-described driving apparatus of the present invention, which comprises the rotation member having the shaft-receiving portion; the shaft fitted into said shaft-receiving portion so as to permit rotation of the rotation member relative to the shaft, the shaft having the protrusion projecting in the direction substantially perpendicular to the axial direction of the shaft; and the restriction member for preventing the rotation member from deviating in the projecting direction of the protrusion, not only deviation of the rotation member in the projection direction of the protrusion, but also displacement of the rotation member in the axial direction of the shaft can be prevented.

The use of the belt trained over the rotation member or the gear meshing with the rotation member as the restriction member can prevent the rotation member from inclining to come out from the shaft.

According to the above-described structure in which the shaft has the front portion and the root portion, the front portion has on the opposite side to the protrusion the slant surface so that front portion tapers off to the tip end thereof, and the root portion has the cylindrical shape so as to rotatably support the rotation member, the shaft can easily be inserted into the shaft-receiving portion of the rotation member so as to carry out an easy mounting of the rotation member, irrespective of the protrusion formed on the shaft.

BRIEF DESCRIPTION OF THE DRAWINGS

FIGS. 1(*a*) and 1(*b*) are constructional views illustrating a driving apparatus of the first embodiment of the present invention;

FIGS. 2(*a*) and 2(*b*) are constructional views illustrating a chassis including a shaft integrally formed therewith, which is used in the driving apparatus of the first embodiment of the present invention FIGS. 3(*a*) and 3(*b*) are cross sectional views illustrating a pulley used in the driving apparatus of the first embodiment of the present invention;

FIGS. 4(*a*), 4(*b*) and 4(*c*) are views illustrating assembling steps for mounting the pulley on the shaft integrally formed with the chassis, which is used in the driving apparatus of the first embodiment of the present invention;

FIGS. 5(*a*) and 5(*b*) are constructional views illustrating a driving apparatus of the second embodiment of the present invention;

FIGS. 7(*a*), 7(*b*) and 7(*c*) are views illustrating modifications of the shaft, which can be used in the embodiments of the present invention; and FIGS. 8(*a*), 8(*b*) and 8(*c*) are views illustrating assembling steps for mounting a pulley on a shaft in the conventional driving apparatus.

DETAILED DESCRIPTION OF THE PREFERRED EMBODIMENTS

Now, embodiments of a driving apparatus of the present invention will be described in detail below with reference to the accompanying drawings.

The driving apparatus of the first embodiment of the present invention is shown partially in FIGS. 1(*a*) and 1(*b*), on the basis of which the structure of the driving apparatus of the present invention will be described below.

Figure 1A:
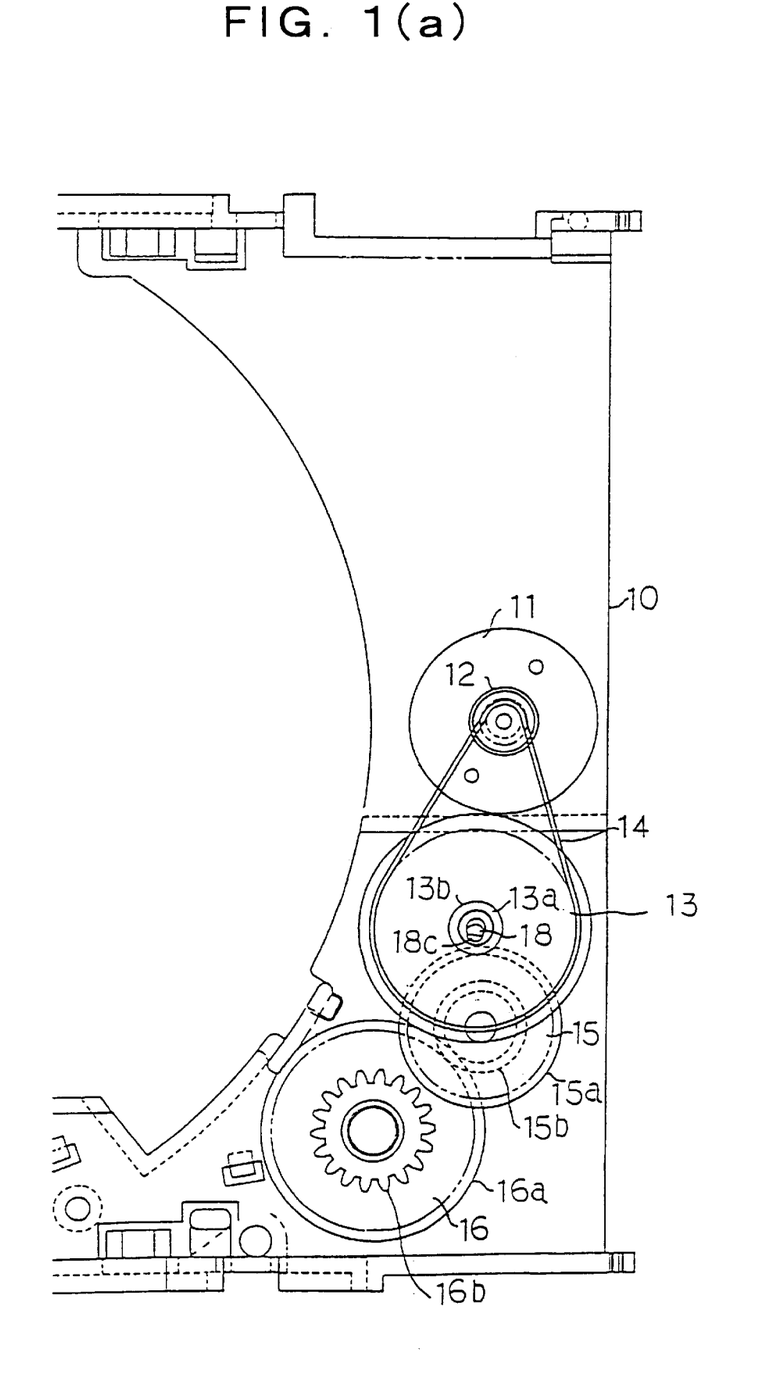
Figure 1B:
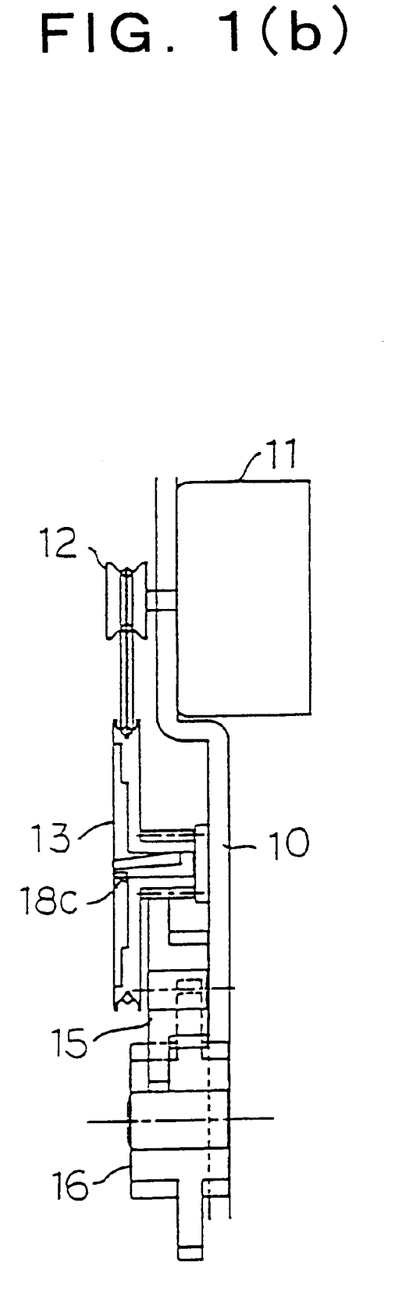

FIG. 1(*a*) is a plan view illustrating the driving apparatus, which can be applied for example to a loading mechanism for drawing out or retracting a tray of a reproducing apparatus for a compact disc. FIG. 1(*b*) is a side view of the above-mentioned driving apparatus.

As shown in FIGS. 1(*a*) and 1(*b*), a motor 11 is mounted on a chassis 10 formed of synthetic resin, which is used in the driving apparatus of the first embodiment of the present invention. There are disposed on the chassis 10 a pulley 13, an intermediate gear 15, a loading gear 16, which meshes with a rack integrally formed with a tray (not shown) to make transmission of a driving power, and the other constructional components.

A small-diameter pulley 12 for transmitting the rotational power of the motor 11 to the pulley 13 serving as the rotation member is secured to a shaft of the motor 11. The pulley 13 and the small-diameter pulley 12 are connected with each other through a belt 14, which is trained over them and serves as the restriction member for preventing an unintended movement of the pulley 13 such as a slide or inclination. The above-mentioned belt 14 is formed of material having resiliency such as rubber into an endless ring-shape.

The pulley 13 is rotatably supported on a shaft 18 integrally formed with the chassis 10. The shaft 18 is provided on its side surface opposite to the small-diameter pulley 12 with a protrusion 18*c* for preventing the pulley 13 from coming out from the shaft 18. The protrusion 18*c* projects from the above-mentioned side surface toward the opposite side to the small-diameter pulley 12 relative to the shaft 18.

Figure 3A:
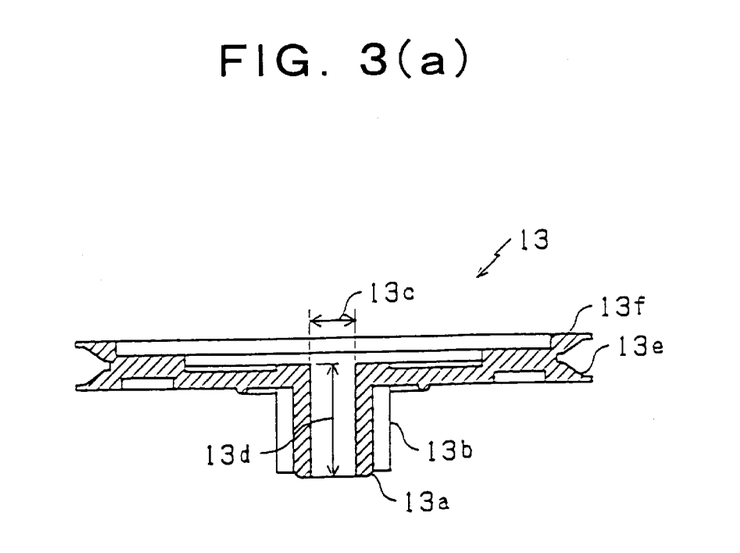
Figure 3B:
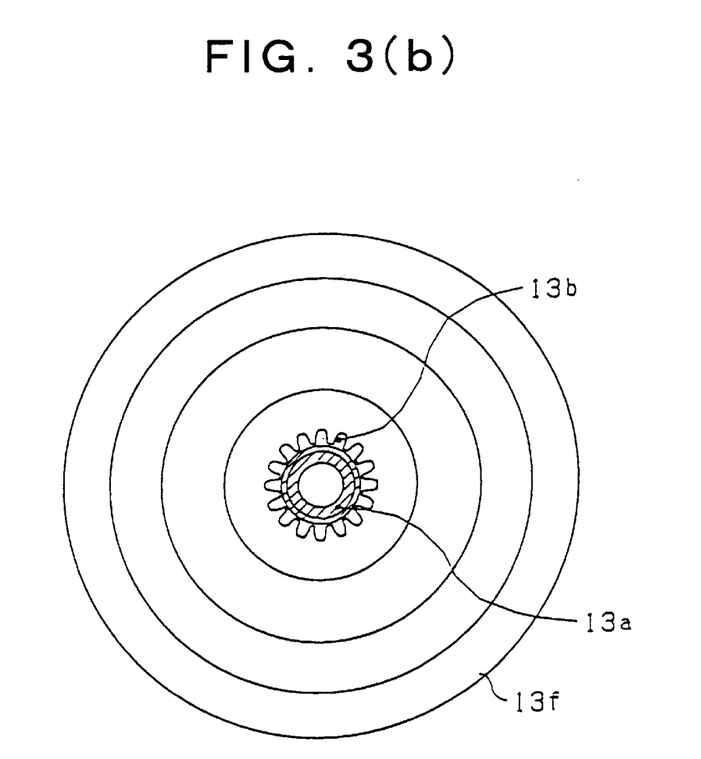

The pulley 13 is provided with a shaft-receiving portion 13*a*, which has a pulley-gear 13*b* formed on the outer periphery of the shaft-receiving portion 13*a* so as to be coaxial with the central axis of the pulley 13 as shown in FIGS. 3(*a*) and 3(*b*). The intermediate gear 15 has an external gear portion 15*a*, which meshes with the pulley-gear 13*b* with the result that the rotational power of the pulley 13 is transmitted to the intermediate gear 15.

The intermediate gear 15 is provided with an intermediate internal gear portion 15*b*, which is formed so as to be coaxial with the central axis of the intermediate gear 15 and has a small diameter than the external gear portion 15*a*. The loading gear 16 is disposed so that a loading external gear portion 16*a* of the loading gear 16 meshes with the above-mentioned internal gear portion 15*b*.

The loading gear 16 is provided with a loading internal gear portion 16*b*, which is formed so as to be coaxial with the central axis of the loading gear 16. A rack (not shown) extending linearly in the horizontal direction in FIG. 1 is disposed so as to mesh with the loading internal gear portion 16*b*. The rack is formed integrally with a tray for receiving a compact disc (i.e., a CD) as a recording medium.

Accordingly, the rotational power of the motor 11 is transmitted to the pulley 13 through the small diameter pulley 12 and the belt 14 in the prescribed reduction ratio. Then, the rotational power of the pulley-gear 13*b* of the pulley 13 is transmitted to the intermediate gear 15 and the loading gear 16 in the prescribed reduction ratio. The engagement of the loading internal gear portion 16*b* of the loading gear 16 with the rack extending linearly causes to convert the rotational motion of the loading internal gear portion 16*b* into the linear motion of the rack. The rack moves in the horizontal direction in FIG. 1 to cause the tray to be drawn out from a disc player or retracted therein so as to carry out the loading or unloading of the compact disc.

Now, description will be given with reference to FIGS. 2(*a*) and 2(*b*) of the structure of the shaft 18, which is used in the driving apparatus of the first embodiment of the present invention and description will be given with reference to FIGS. 3(*a*) and 3(*b*) of the structure of the pulley 13 serving as the rotation member, which is used in the above-mentioned driving apparatus. The step for mounting the pulley 13 on the chassis 10 will be described with reference to FIGS. 4(*a*), 4(*b*) and 4(*c*).

Figure 2A:
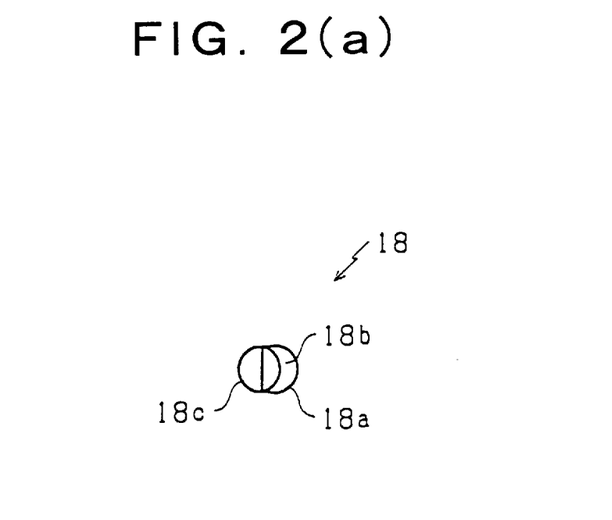
Figure 2B:
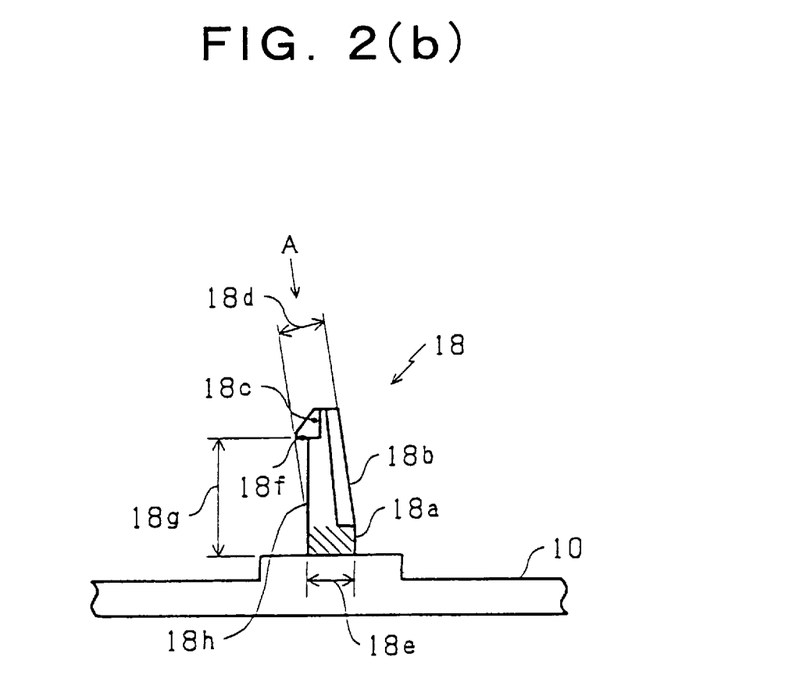

The chassis 10 formed of synthetic resin, which is used in the driving apparatus of the first embodiment of the present invention is provided with the shaft 18 formed integrally with the chassis 10 as shown in FIG. 2(*b*). The shaft 18 is capable of fitting into the shaft-receiving portion 13*a* of the pulley 13.

FIG. 2(*a*) is a plan view illustrating the shaft 18 and FIG. 2(*b*) is a partial side view illustrating the chassis 10 including the shaft 18 formed integrally therewith. FIG. 3(*a*) is a cross-sectional view illustrating the pulley 13 and FIG. 3(*b*) is a bottom view illustrating the pulley 13.

The shaft 18 formed integrally with the chassis 10 is composed of a cylindrical-shaped portion 18*a* (i.e., a hatched region in FIG. 2(*b*)), a vertical surface 18*h*, a slant surface 18*b* and a protrusion 18*c* as shown in FIG. 2(*b*). The cylindrical-shaped portion 18*a* projects from the surface of the chassis 10 by a prescribed length, on which the pulley 13 is to be mounted. The vertical surface 18 is located so as to make a right angle with the surface of the chassis 10. The slant surface 18*b* is located on the opposite side to the vertical surface 18 so that the front portion of the shaft 18 tapers off to the tip end thereof. The protrusion 18*c* has a half-truncated cone shape and projects from the front end of the vertical surface 18*h* toward the opposite side to the small-diameter pulley 12 relative to the shaft 18 in a direction substantially perpendicular to the axial direction (i.e., the vertical direction in FIG. 2(*b*)) of the shaft 18. The shapes of the slant surface 18*b* and the protrusion 18*c* are designed so as to inscribe a cylinder, which has a slightly smaller diameter than the inner diameter 13*c* described later of the pulley 13 and the same diameter as the longest diameter 18*d* described later, so that the pulley 13 can be mounted in the inclined state on the shaft from the upper side of the shaft 18, i.e., in a direction indicated by an arrow "A" as shown in FIG. 2. The slant surface 18*b* formed at the front end of the shaft 18 can guide the shaft-receiving portion 13*a* of the pulley 13 when mounting the pulley 13 on the shaft 18, thus leading to easy insertion of the shaft 18 into the shaft-receiving portion 13*a*. The cylindrical-shaped portion 18*a* formed at the root end portion of the shaft 18 (i.e., the end portion of the chassis-side of the shaft 18) can support securely the pulley 13 mounted on the shaft 18, permitting the stable rotation of the pulley 13.

The longest diameter 18*d* of the head portion of the shaft 18, which includes the half-truncated cone-shaped protrusion 18*c* and the slant surface 18*b* is designed to be slightly smaller than the diameter 18*e* of the cylindrical-shaped portion 18*a* of the shaft 18. The distance 18*g* between the bottom portion 18*f* of the half-truncated cone-shaped protrusion 18*c* and the surface of the chassis 10 on which the pulley 13 is to be mounted is designed to be slightly longer than the thickness 13*d* of the shaft-receiving portion 13*a* of the pulley 13. Accordingly, the vertical movement (in FIG. 2(*b*)) of the pulley 13 mounted on the shaft 18 can be restricted by the bottom portion 18*f* of the half-truncated cone-shaped protrusion 18*c* without causing the resistance to rotation of the pulley 13.

The pulley 13 is composed of a disc-shaped portion 13*f*, the shaft-receiving portion 13*a* and the pulley-gear 13*b* as shown in FIG. 3(a). The disc-shaped portion 13f has a groove 13e over which the belt 14 is trained so as to connect the outer peripheral portion of the pulley 13 with the small-pulley 12 of the motor 11. The shaft-receiving portion 13a is formed so as to be coaxial with the disc-shaped portion 13f. The pulley-gear 13b is formed on the outer peripheral portion of the shaft-receiving portion 13a as shown in FIG. 3(b). The shaft-receiving portion 13a of the pulley is designed to have an inner diameter 13c, which is slightly larger than the diameter 18e of the shaft 18. The protrusion 18c of the shaft 18 projects above from the upper surface of the shaft-receiving portion 13a of the pulley and the bottom portion 18f of the protrusion 18c is located in the vicinity of the upper surface of the shaft-receiving portion 13a under a condition that the pulley 13 is completely mounted on the shaft as described later. Accordingly, the shaft-receiving portion 13a of the pulley is designed to have a thickness 13d, which is slightly smaller than the distance 18g between the bottom portion 18f of the protrusion 18c and the surface of the chassis 10 on which the pulley 13 is to be mounted.

Figure 4A:
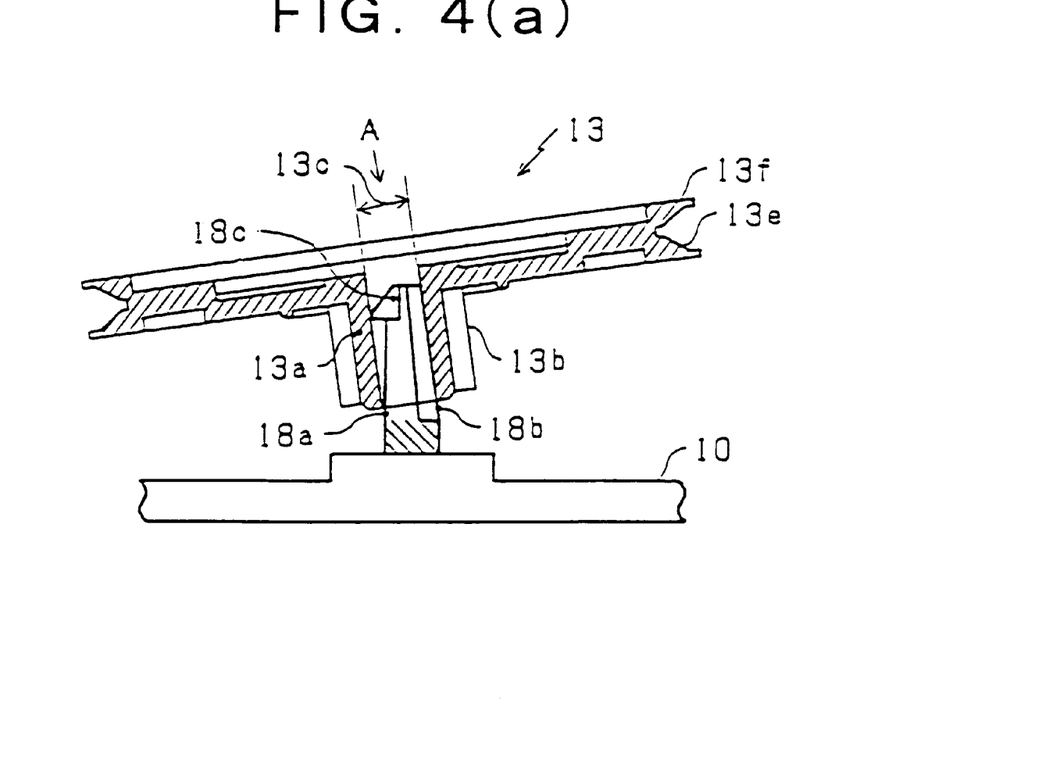
Figure 4B:
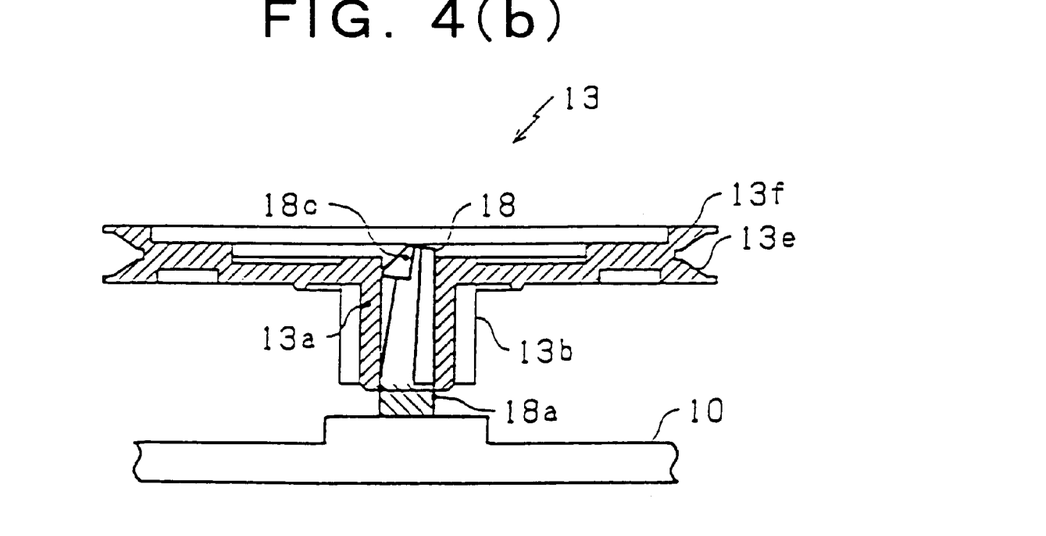
Figure 4C:
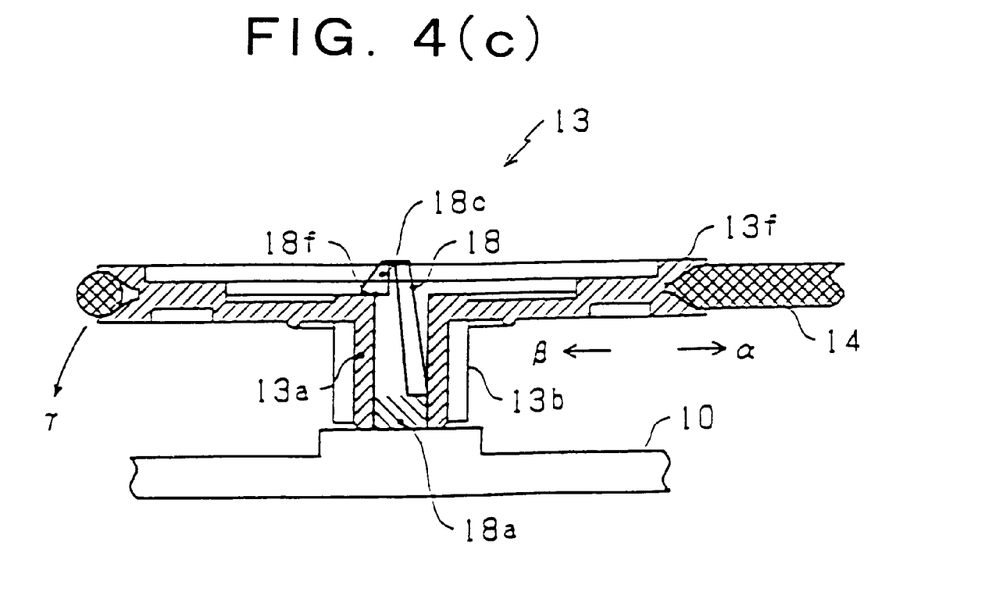

FIGS. 4(a), 4(b) and 4(c) illustrate the assembling steps for mounting the pulley 13 on the shaft 18 integrally formed with the chassis 10. Description of the assembling steps will be given below.

First, the pulley 13 is inclined relative to the axial direction of the shaft at a small inclination angle thereto, and the pulley 13 is then slid along the slant surface 18b in the direction indicated by an arrow "A" as shown in FIG. 4(a) so that the shaft 18 is inserted into the shaft-receiving portion 13a of the pulley 13.

The longest diameter 18d of the head portion of the shaft 18 is designed to be slightly smaller than the diameter 18e of the cylindrical-shaped portion 18a of the shaft 18 and the slant surface 18b is formed on the opposite side to the vertical surface 18 so that the front portion of the shaft 18 tapers off to the tip end thereof, as described above. Accordingly, the shaft-receiving portion 13a of the pulley 13 can easily be slid to an intermediate portion of the shaft 18. When the bottom portion of the shaft-receiving portion 13a of the pulley 13 comes into contact with the cylindrical portion 18a of the shaft 18, there occurs the resistance to the further sliding of the pulley 18.

Such a resistance is caused by sliding the shaft-receiving portion 13a of the pulley in an inclined state relative to the cylindrical portion 18a of the shaft 18. The shaft 18 is formed of synthetic resin integrally with the chassis 10 and has resiliency.

When the pulley 13 slid in the inclined state is positioned to be in parallel with the chassis 10 against the resiliency of the shaft 18, the front portion of the shaft 18, which includes the protrusion 18c is elastically deformed within the shaft-receiving portion 13a so that the shaft-receiving portion 13a of the pulley 13 is deviated so as to be substantially coaxial with the cylindrical portion 18a of the shaft 18. In this condition, the further slide of the pulley 13 causes the shaft-receiving portion 13a of the pulley 13 to reach the upper end of the cylindrical portion 18a as shown in FIG. 4(b).

The shaft 18 can be deformed elastically in the middle of the mounting operation of the pulley 13 on the shaft 18 as shown in FIG. 4(b). A proper selection and determination of material and a shape of the shaft 18 is made so that, after the complete mounting of the pulley 13 on the shaft 18, the shaft 18 may not easily be deformed elastically by the tension given by the belt 14, which is trained over the pulley 13.

Then, the still further slide of the pulley 13 causes the protrusion 18c of the shaft 18 to come out and project from the upper surface of the shaft-receiving portion 13a. The mounting operation of the pulley 13 on the shaft 18 is completed in this manner.

Projecting the protrusion 18c of the shaft 18 from the upper surface of the shaft-receiving portion 13a loses the stress, which had been given to the shaft 18 by the elastic deformation of the shaft 18. The portion between the tip end of the shaft 18 and the front end of the cylindrical portion 18a is restored to be perpendicular to the chassis 10 so that the bottom portion 18f of the protrusion 18c is positioned so as to be in parallel with the chassis 10. Under such a condition, the movement of the pulley 13 in the axial direction thereof can be restricted by the protrusion 18c, thus preventing the pulley 13 from coming out the shaft 18.

After the completion of the mounting operation of the pulley 13 onto the shaft 1, the belt 13 is trained over the groove 13e of the pulley 13 so as to connect the pulley 13 to the small-diameter pulley 12 of the motor 11.

The connection of the pulley 13 to the small-diameter pulley 12 of the motor 11 causes the occurrence of tension applied to the pulley 13 in a direction of existence of the small-diameter pulley 12, which is indicated by an arrow "α" as shown in FIG. 4(c). The belt 14 can prevent the pulley 13 from being slid in a direction indicated by an arrow "β" and from being inclined in a direction indicated by an arrow of "γ" (see FIG. 4(c)). The slide in the direction "β" and the inclination in the direction of "γ" of the pulley 13 cause the pulley 13 to come easily out from the shaft 18 in an inverse manner to the mounting operation described above of the pulley 13. Such an unfavorable deviation of the pulley 13 is restricted by the belt 14, thus preventing the pulley 13 from coming out from the shaft 18. As a result, the shaft-receiving portion 13a of the pulley 13 can be completely supported on the cylindrical portion 18a of the shaft 18. The shaft-receiving portion 13a of the pulley 13 has an inner diameter, which is slightly larger than the diameter 18e of the shaft 18 so as to maintain a proper clearance by which the pulley 13 can rotate smoothly. The stable and smooth rotation of the pulley 13 can be obtained and securely transmitted to the intermediate gear 15.

Figure 5A:
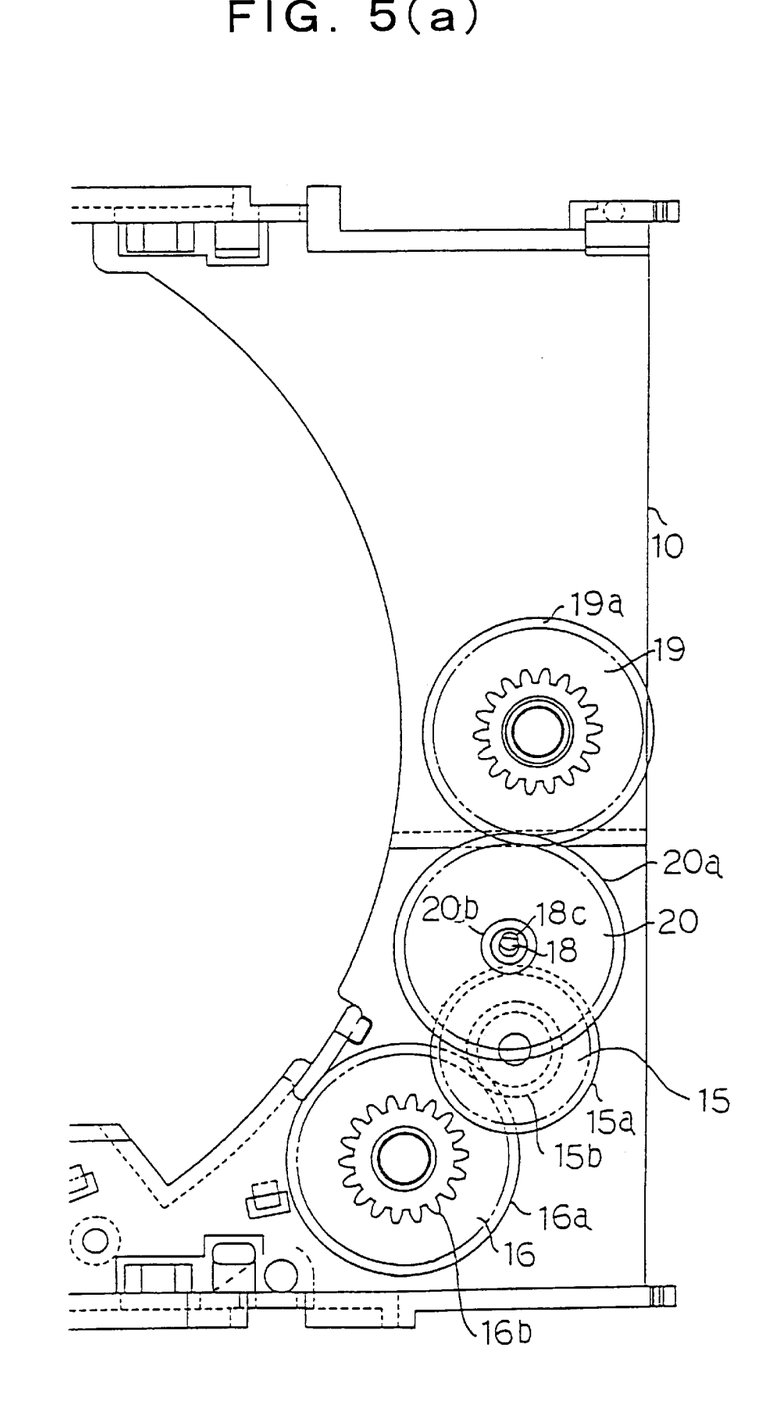
Figure 5B:
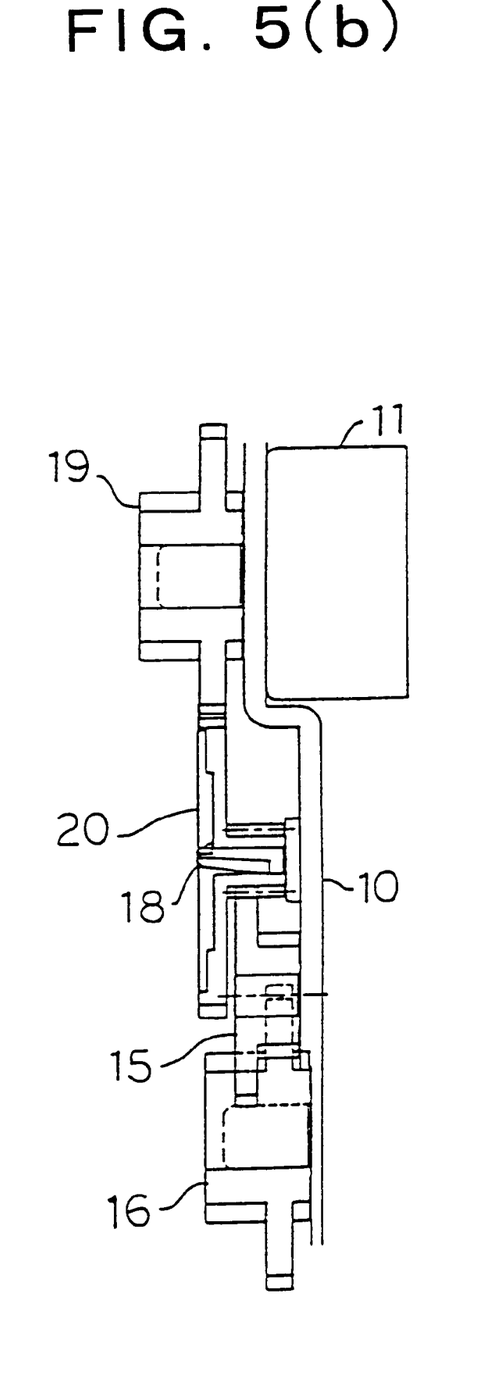

FIGS. 5(a) and 5(b) illustrate the driving apparatus of the second embodiment of the present invention. Now, the structure of the driving apparatus of the second embodiment of the present invention will described with reference to FIGS. 5(a) and 5(b). The same reference numbers are given to the common constructional components and further description thereof will be omitted.

FIG. 5(a) is a plan view illustrating the driving apparatus and FIG. 5(b) is a side view illustrating the same apparatus.

A driving gear 19 is secured to the shaft of the motor 11 so as to carry out the transmission of rotational power of the motor 11. A driving-external gear portion 19a formed on the outer periphery of the driving gear 19 meshes with a transmission-external gear portion 20a formed on the outer periphery of a transmission gear 20.

The transmission gear 20 is mounted on the shaft 18 formed integrally with the chassis 10. The shaft 18 has a protrusion 18c formed thereon, which projects on the existing side of the driving gear 19 and prevents the transmission gear 20 from coming out from the shaft 18.

The transmission gear 20 is provided with a transmission-internal gear portion 20b, which is formed so as to be coaxial with the central axis of the transmission gear 20 and has a smaller diameter than the transmission-external gear portion 20a. An intermediate gear 15 having an intermediate-external gear portion 15a formed on the outer periphery thereof is disposed so as to mesh with the transmission-internal gear portion 20b. The rotational power of the transmission gear 20 is transmitted to the intermediate gear 15 in this manner.

The intermediate gear 15 is provided with an intermediate-internal gear portion 15b, which is formed so as to be coaxial with the central axis of the intermediate gear 15 and has a smaller diameter than the intermediate-external gear portion 15a. The intermediate-internal gear portion 15b meshed with a loading-external gear portion 16a of a loading gear 16. The loading gear 16 is provided with a loading-internal gear portion 16b, which is formed so as to be coaxial with the loading-external gear portion 16a and has a smaller diameter than the loading-external gear portion 16a. The loading-internal gear portion 16b meshes with a rack (not shown).

Accordingly, the rotational power of the motor 11 is transmitted through the driving gear 19 to the transmission gear 20. The rotational power of the transmission-internal gear portion 20b of the transmission gear 20 is transmitted to the intermediate gear 15 and the loading gear 16 in the respective prescribed reduction ratios.

The driving apparatus of the second embodiment of the present invention differs from that of the first embodiment of the present invention in that the rotational power of the motor 11 is transmitted to the transmission gear 20 through the gear train.

The feature of the second embodiment will be described below with reference to FIG. 6 in which only four constructional components of the motor 11, the driving gear 19, the shaft 18 and the transmission gear 20 as shown in FIG. 5(b) are illustrated in order to facilitate the understanding.

The step for mounting the transmission gear 20 on the shaft 18 formed integrally with the chassis 10 is identical to that described in the first embodiment of the present invention. The description of the above-mentioned step is therefore omitted.

The transmission gear 20 having the transmission-external gear portion 20a formed on the outer periphery thereof is mounted on the shaft 1. The transmission gear 20 meshes at the meshing portion 30 with the driving-external gear portion 19a of the driving gear 19, which is secured to the shaft of the motor 11.

The protrusion 18c of the shaft 18 is located toward the driving gear 19 so that the bottom portion 18f of the protrusion 18c is placed in the vicinity of the upper surface of the shaft-receiving portion 13a.

Figure 6:
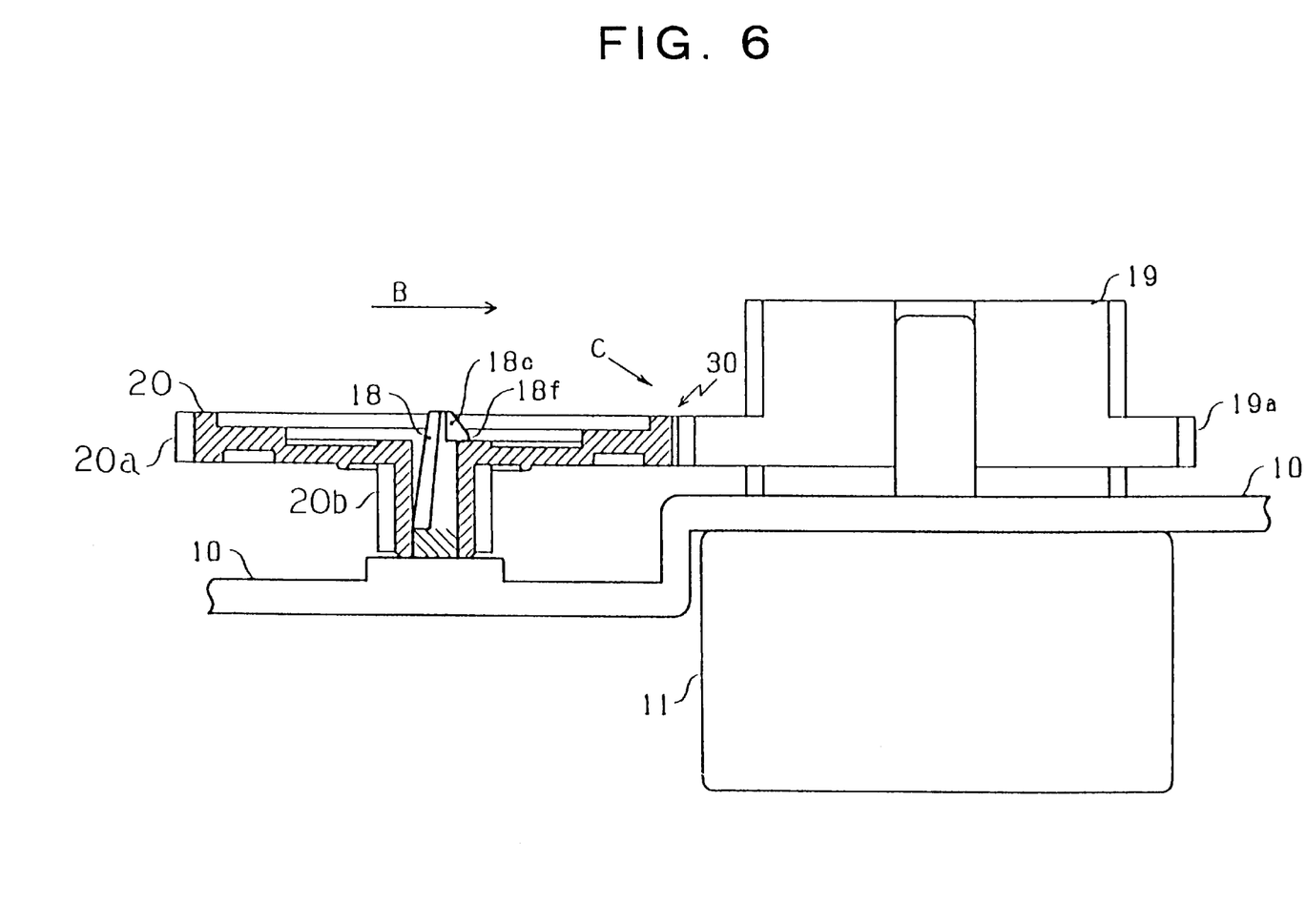
FIG. 6 is a constructional view illustrating a loading motor, a drive gear and a driven gear, which are used in the driving apparatus of the second embodiment of the present invention.

According to the structure in which the protrusion 18c of the shaft 18 is located toward the driving gear 19, the slide in a direction "B" and the inclination in a direction "C" of the transmission gear 20 as shown in FIG. 6, and namely, the inclination of the transmission gear 20 in a direction by which the transmission gear 20 may easily come out from the shaft 18 can be prevented by the engagement of the transmission gear 20 with the driving-external gear portion 19a of the driving gear 19.

The bottom portion 18f of the protrusion 18c, which is placed in the vicinity of the upper surface of the shaft-receiving portion 13a also, prevents the transmission gear 20 from coming out from the shaft 18.

In the above-described first and second embodiments of the present invention, the shaft for mounting the rotation member such as the pulley, the transmission gear or the like is described to be formed integrally with the chassis formed of synthetic resin. The shaft is however limited to such an integrally formed-type, and may be formed into a separate body from the chassis 10, which is secured thereto by means of a fastening member such as a screw. According to such a structure, the same effect can be obtained.

In the first embodiment of the present invention, the restriction member for preventing the rotation member such as the pulley from inclining is not limited to an endless belt, and may be composed of a belt member having the opposite ends. According to such a structure, the same effect can be obtained. The belt member may be composed of a chain made of metal.

Figure 7A:
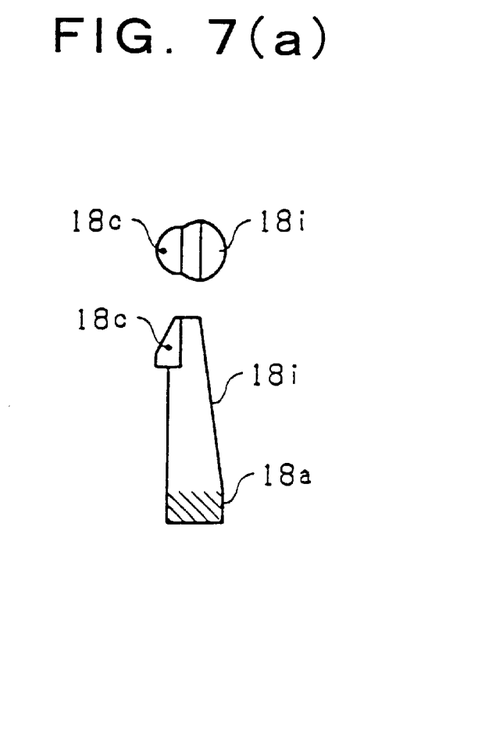
Figure 7B:
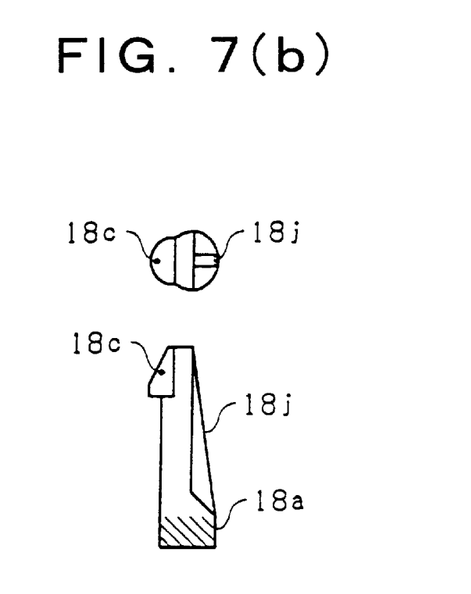
Figure 7C:
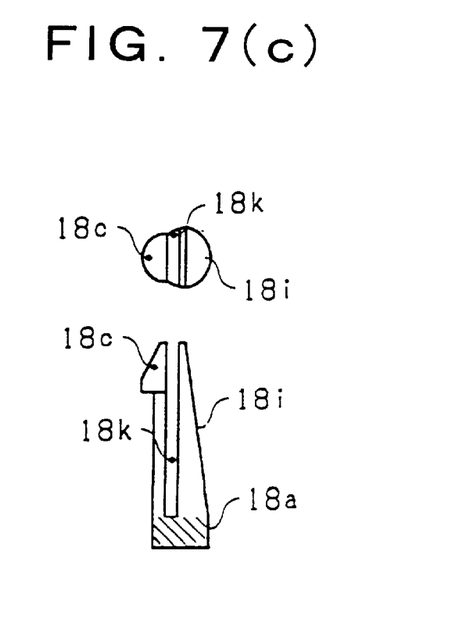

The shape of the shaft is not limited to one as shown in FIGS. 2(a) and 2(b). The shaft may have for example any one of shapes as shown in FIGS. 7(a) to 7(c). In these cases, the shaft may be formed as a separate body or an integral body with the chassis 10.

FIG. 7(a) illustrates a modification of the shaft 18 as shown in FIGS. 2(a) and 2(b). The shaft as shown in FIG. 7(a) differs from the shaft as shown in FIGS. 2(a) and 2(b) in that a slant surface 18i is formed by cutting the opposite surface to the vertical surface along a flat plane unlike the slant surface 18b of FIGS. 2(a) and 2(b) having a round surface, so that the portion between the front end of the cylindrical portion 18a and the tip end of the shaft tapers off to the tip end thereof. Such a construction of the shaft causes an easy design and production in comparison with the shaft as shown in FIGS. 2(a) and 2(b) having the slant round surface. The shaft as shown in FIG. 7(b) has on its one side a rib having a slant surface. According to such a structure, the rib having the slant surface can serve as a guide member for the rotation member such as the pulley to be mounted on the shaft, and vacancies formed on the both sides of the rib contribute to reduction of the production costs of the shaft.

The shaft as shown in FIG. 7(c) is obtained by slitting the shaft as shown in FIG. 7(a) in the vertical direction to form a slit portion 18k extending to the front end of the cylindrical portion 18a, by which the shaft has a U-shape in its plan view. According to such a structure, the front end portion including the protrusion 18c of the shaft 18 can be easily deformed elastically within the shaft-receiving portion of the rotation member such as the pulley when mounting the rotation member on the shaft. The resistivity during mounting the rotation member on the shaft becomes smaller, thus leading to an easy mounting of the rotation member.

According to the present invention as described in detail, the rotation member mounted on the shaft having the protrusion projecting in the direction substantially perpendicular to the axial direction of the shaft is prevented from moving in the projecting direction of the protrusion by the restriction member. It is therefore possible to prevent the rotation member from inclining and coming out from the shaft.

The shaft has the front portion so as to taper off to the tip end thereof by gradually reducing the thickness on the opposite side to the protrusion, and the shaft has the root portion having a cylindrical shape so as to support the rotation member thereon. It is therefore possible to mount easily the rotation member on the shaft, irrespective of the protrusion of the shaft. The cylindrical-shaped portion can securely support the rotation member under a condition that the rotation member is mounted on the shaft, thus permitting a stable and smooth rotation of the rotation member.

What is claimed is:

1. A driving apparatus comprising:

a rotation member having a shaft-receiving portion;

a shaft fitted into said shaft-receiving portion so as to permit rotation of said rotation member relative to said shaft, said shaft having a protrusion projecting in a direction substantially perpendicular to an axial direction of said shaft positioned to come into contact with said rotation member to limit movement thereof in a longitudinal direction of said shaft within a prescribed range of play; and a restriction member for preventing said rotation member from deviating in a projecting direction of said protrusion.

2. The apparatus as claimed in claim 1, wherein:

said shaft has on an opposite side to said protrusion a slant surface so that said shaft tapers off to a tip end thereof.

3. The apparatus as claimed in claim 1, wherein:

said shaft has a front portion and a root portion, said front portion has on an opposite side to said protrusion a slant surface so that front portion tapers off to a tip end thereof, and said root portion has a cylindrical shape so as to rotatably support said rotation member.

4. The apparatus as claimed in claim 1, wherein:

said restriction member serves as a power transmission device relative to said rotation member.

5. The apparatus as claimed in claim 1, wherein:

said restriction member comprises a belt trained over said rotation member.

6. The apparatus as claimed in claim 5, wherein:

said shaft has on an opposite side to said protrusion a slant surface so that said shaft tapers off to a tip end thereof.

7. The apparatus as claimed in claim 5, wherein:

said shaft has a front portion and a root portion, said front portion has on an opposite side to said protrusion a slant surface so that front portion tapers off to a tip end thereof, and said root portion has a cylindrical shape so as to rotatably support said rotation member.

8. The apparatus as claimed in claim 1, wherein:

said restriction member comprises a gear meshing with said rotation member.

9. The apparatus as claimed in claim 8, wherein:

said shaft has on an opposite side to said protrusion a slant surface so that said shaft tapers off to a tip end thereof.

10. The apparatus as claimed in claim 8, wherein:

said shaft has a front portion and a root portion, said front portion has on an opposite side to said protrusion a slant surface so that front portion tapers off to a tip end thereof, and said root portion has a cylindrical shape so as to rotatably support said rotation member.

* * * * *